(12) United States Patent
Micko et al.

(10) Patent No.: US 9,287,733 B2
(45) Date of Patent: Mar. 15, 2016

(54) DEVICE FOR MINIMIZING THE CURRENT CONSUMPTION OF A MOTOR VEHICLE GENERATOR FROM THE BATTERY DURING THE STARTING PHASE OF THE MOTOR VEHICLE

(75) Inventors: Andre Micko, Changsha (CN); Michael Herz, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 973 days.

(21) Appl. No.: 13/508,820

(22) PCT Filed: Nov. 3, 2010

(86) PCT No.: PCT/EP2010/066718
§ 371 (c)(1),
(2), (4) Date: Aug. 24, 2012

(87) PCT Pub. No.: WO2011/061055
PCT Pub. Date: May 26, 2011

(65) Prior Publication Data
US 2012/0306267 A1  Dec. 6, 2012

(30) Foreign Application Priority Data

Nov. 17, 2009  (DE) .................. 10 2009 046 760

(51) Int. Cl.
*B60L 1/00* (2006.01)
*H02J 7/14* (2006.01)
*H02P 9/08* (2006.01)
*H02P 9/48* (2006.01)

(52) U.S. Cl.
CPC ................ *H02J 7/1446* (2013.01); *H02P 9/08* (2013.01); *H02P 9/48* (2013.01); *Y02T 10/92* (2013.01)

(58) Field of Classification Search
CPC .......... H02J 7/1446; Y02T 10/92; H02P 9/48; H02P 9/08
USPC .......................................................... 307/10.1
See application file for complete search history.

(56) References Cited

U.S. PATENT DOCUMENTS

2006/0186863 A1* 8/2006 Yamamoto et al. ............. 322/28
2007/0085512 A1* 4/2007 Maehara ......................... 322/28
2009/0072794 A1* 3/2009 Okuno .......................... 320/145

FOREIGN PATENT DOCUMENTS

| JP | 2005-176422 | 6/2005 | | |
| JP | GB 2 424 491 A | * | 9/2006 | ............... H02J 7/24 |
| JP | 2006-271094 | 10/2006 | | |

* cited by examiner

*Primary Examiner* — Jared Fureman
*Assistant Examiner* — Duc M Pham
(74) *Attorney, Agent, or Firm* — Kenyon & Kenyon LLP

(57) ABSTRACT

A device for minimizing the current consumption of a motor vehicle generator from the battery during the starting phase of a motor vehicle, has a generator unit and a generator regulator. The generator regulator includes a regulator control, which has a unit for providing a first control signal having a fixedly specified pulse duty factor, a unit for providing a second control signal having a pulse duty factor that is a function of the excitation current, and a unit for selecting the control signal having the smaller of the two pulse duty factors, which is supplied to the output stage of the generator regulator as the control signal.

5 Claims, 2 Drawing Sheets

DEVICE FOR MINIMIZING THE CURRENT CONSUMPTION OF A MOTOR VEHICLE GENERATOR FROM THE BATTERY DURING THE STARTING PHASE OF THE MOTOR VEHICLE

BACKGROUND OF THE INVENTION

1. Field of the Invention

The present invention relates to a device for minimizing the current consumption of a motor vehicle generator from the battery during the starting phase of the motor vehicle 2. Description of Related Art It is known that one may control the output voltage of a generator using a generator regulator. The output voltage of a generator is a function of several influencing variables, to which belong the rotational speed, the electrical load in the vehicle electrical system, the charging state of the starter battery and the temperature. In order to generate a constant voltage in the vehicle electrical system, the generator regulator regulates the output voltage within specified limits. This regulation takes place via an adjustment of the excitation current flowing through the excitation winding of the generator. In order to adjust the excitation current, a change in the pulse duty factor of a PWM control signal made available by the regulator control for a switching transistor is carried out.

In the use of a high-side transistor as switching transistor of the generator regulator, the excitation current is taken away from a DC supply connection B+, and is guided via the transistor to the excitation winding. The second connection of the excitation winding is connected to ground.

The alternating voltages generated at phase voltage connections U, V and W are rectified in a rectifier device having a plurality of branches, and are provide to the vehicle electrical system of the motor vehicle and also conducted to the above-mentioned direct-voltage supply connection.

Furthermore, the generator regulator is also connected to at least one of the phase voltage connections of the generator, in order to evaluate at least one of the phase voltages of the generator.

The generator regulator has a regulator control which supplies a switching signal for the switching transistor of the generator regulator, and to which, as the input signal, present at the direct voltage supply connection B+ as well as the at least one of the phase voltages of the generator are supplied.

It is known that, at an engine start using the generator regulator, one may generate a PWM control signal having a specified fixed pulse duty factor, in order to provide an excitation current. This is a condition in order, at the engine start, to be able to ensure a certain rotational speed detection. The pulse duty factor mentioned is selected so that an engine start is able to be certainly detected in all temperature ranges using a rotational speed detection via at least one phase voltage. The phase voltage, in this instance, has to have a sufficiently great amplitude.

The amplitude of the phase voltage is a function of the excitation current, and with that, in the case of a fixedly set pulse duty factor, also of the temperature, by which an ohmic resistance, provided in the excitation circuit, is affected.

In order to assure a certain rotational speed evaluation in the engine start phase at all temperatures, the pulse duty factor in the standstill phase has to be set corresponding to the unfavorable conditions.

However, this has the result that, in case of the presence of more suitable working points, such as are present at lower temperatures, at the fixedly set pulse duty factor a larger excitation current comes about, and with that, a greater current consumption from the battery of the vehicle than would be necessary.

From published German patent application document DE 69213538 T2, a monitoring circuit is known for a device for reloading a battery in a vehicle, which prevents a high current consumption when the motor vehicle is standing still or the engine is shut down. The monitoring circuit mentioned includes a sensor stage which supplies a signal that indicates a current flowing in the field coil. The current flow through the control transistor of the field coil is regulated so that there exists a first or a second operating mode. In the first operating mode, which is initiated when the rotational speed of the generator is less than a specified level, a peak current, having a low average value, flows in the field coil. In the second operating mode, which is initiated when the rotational speed of the generator is greater than the specified level, a peak current, having a higher average value, flows in the field coil. In the known monitoring circuit, as a result, the current flowing through the field coil is modified as a function of the speed of the rotor of the generator.

BRIEF SUMMARY OF THE INVENTION

By contrast, a device according to the present invention has the advantage that at an engine start at a vehicle standstill and a generator standstill, the maximum current consumption from the battery is limited or reduced, and yet, in the complete temperature range, sufficient excitation is ensured for the certain detection of the engine start using an evaluation of one of the phase voltages of the generator of the motor vehicle. This means that, in the state of standstill clock pulses, in which the engine of the motor vehicle is in the standstill phase, but the generator regulator is active, the current consumption of the regulator/generator from the battery is reduced or limited.

This is achieved, according to the present invention, essentially in that the regulator control has means for providing a first control signal, which has a specified, fixedly set pulse duty factor, means for providing a second control signal which has a pulse duty factor that is a function of an excitation current, and means for selecting the control signal having the smaller of the two pulse duty factors.

DETAILED DESCRIPTION OF THE INVENTION

Figure 1:
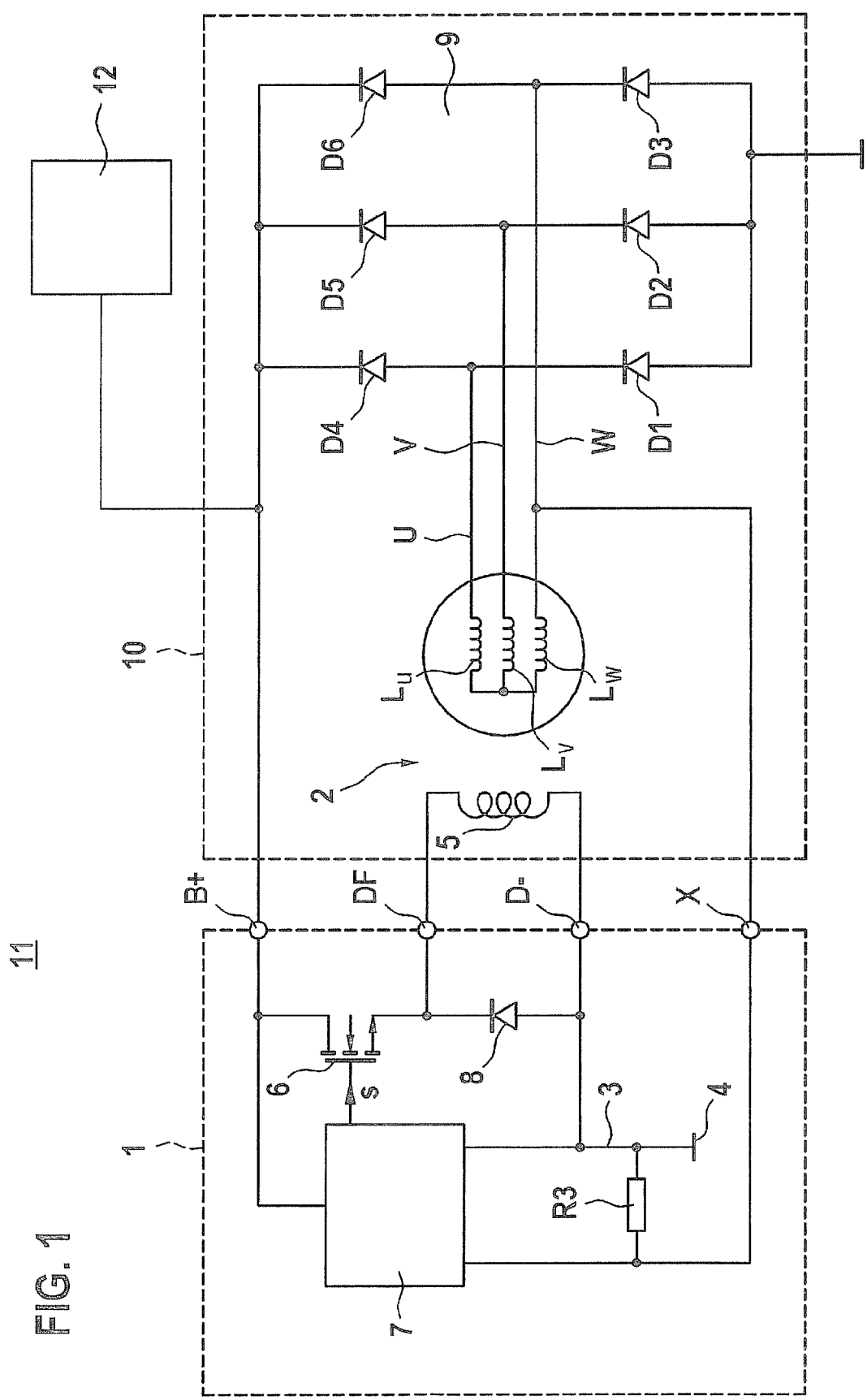
FIG. 1 shows a circuit diagram of a generator device according to an exemplary embodiment of the present invention.

FIG. 1 shows a circuit diagram of a generator device according to an exemplary embodiment of the present invention. Generator device 11 has a generator regulator 1 and a generator unit 10, which at its output provides a direct supply voltage for vehicle electrical system 12 of a motor-vehicle.

Generator unit 10 has a generator 2 and a rectifier layout 9. Generator 2 includes an excitation winding 5 and phase windings $L_U$, $L_V$, $L_W$, which are connected to one another in the form of a star connection, for example. Generator 2, at its phase voltage connections U, V and W, provides alternating voltages which are supplied to post-connected rectifier layout 9. Alternatively to the exemplary embodiment shown, there may be a different number of phases or phase voltage connections present.

Rectifier layout 9 includes three branches corresponding to the number of phase strings, of which each has one series connection of two diodes or other suitable components and is assigned to one of the phase voltage connections of the generator.

Phase voltage connection U of generator 2 is connected to the connecting point between diodes D1 and D4 of the first rectifier branch. Phase voltage connection V of generator 2 is connected to the connecting point between diodes D2 and D5 of the second rectifier branch. Phase voltage connection W of generator 2 is connected to the connecting point between diodes D3 and D6 of the third rectifier branch.

The cathodes of diodes D4, D5 and D6 are connected to one another. At that point, the direct output voltage of generator unit 10 is provided and passed on to vehicle electrical system 12. The anodes of diodes D1, D2 and D3 are also connected to one another and are attached to ground.

Moreover, phase voltage connection W of generator 2 is connected via a terminal X of generator regulator 1 to regulator control 7 of generator regulator 1 and via a resistor R3 and a ground connection 3 of the generator regulator to a ground 4.

Generator regulator 1 has an operating voltage terminal B+ as well as additional terminals DF, D− and X. The generator regulator also includes a regulator control 7. Regulator control 7 is provided to provide an output stage 6, which has a switching transistor, with a PWM control signal. Regulator control 7 is also connected to operating voltage terminal B+ and, via ground connection 3 to ground 4. Furthermore, regulator control 7 is connected to terminal X of generator regulator 1, in order to receive a phase voltage signal derived from phase voltage terminal W of generator 2.

In addition, the device shown in FIG. 1 has an excitation current circuit. It runs to ground 4, from operating voltage terminal B+ of generator regulator 1 via switching transistor 6 of the generator regulator, terminal DF of the generator regulator, excitation winding 5, terminal D− of the generator regulator and ground connection 3 Between terminals D− and DF of generator regulator 1, either a freewheeling diode 8 is connected or an active freewheeling using a switching transistor is used.

Regulator control 7, which is connected to operating voltage terminal B+ and via terminal X to phase voltage terminal W of generator 2, controls switch 6 using a control signal s in such a way that an excitation current flows through excitation winding 5, which is a function both of the direct voltage present at operating voltage terminal B+ and of the phase voltage supplied to it via terminal X.

Figure 2:
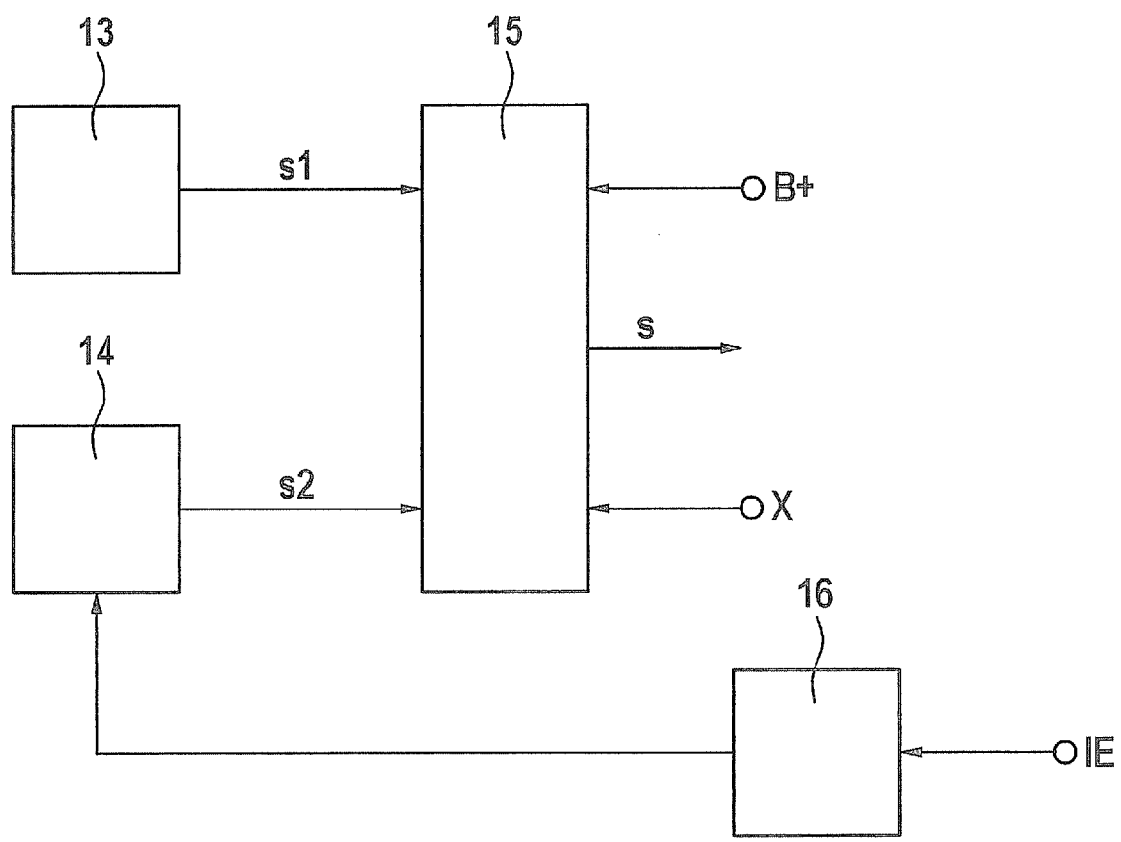
FIG. 2 shows a detailed representation of the regulator control of the generator regulator shown in FIG. 1.

FIG. 2 shows a detailed representation of a part of regulator control 7. This has means 13 for providing a first control signal s1, which has a specified, fixedly set pulse duty factor. Data which correspond to this specified, fixedly set pulse duty factor, are preferably stored during the production of the generator regulator at the factory, in a nonvolatile manner in means 13, which include a nonvolatile memory.

Furthermore, regulator control 7 has means 14 for providing a second control signal s2, which has a pulse duty factor that is a function of excitation current IE. Means 14, for providing second control signal s2, include a computing unit which ascertains second control signal s2 as a function of the excitation current. The information on the excitation current is supplied to the computing unit by means 16 for measuring the excitation current, which are connected to the computing unit. Means 16 are a measuring resistor, for example, which is connected to excitation coil 5, and at which a voltage corresponding to the excitation current drops.

Moreover, regulator control 7 includes means 15 for selecting the control signal having the smaller of the two abovementioned pulse duty factors. These means 15 include a comparator, which is connected to means 13 for providing first control signal s1 and to means 14 for providing second control signal s2, and which provides, on the output side, control signal s having the smaller of the two abovementioned pulse duty factors. Control signal s is supplied to output stage 6, shown in FIG. 1, which has a switching transistor.

The comparator of means 15 named is preferably a component of a computing unit, to which the operating voltage is also supplied, via terminal B+, and which is connected via terminal X to phase voltage terminal W of generator 2. This computing unit is also provided after the ending of the starting process for ascertaining a control signal s for output stage 6 of generator regulator 1, the computing unit taking into account the operating voltage and the phase voltage in the ascertainment of control signal s.

After all that, a device according to the present invention ensures that, at an engine start of the motor vehicle a rotational speed detection via the phase voltage is possible in all temperature ranges. For this purpose, the regulator control has means for providing a first control signal s1, which has a pulse duty factor that is specified, fixedly set and stored in a nonvolatile manner in a memory of the regulator control, has means for providing a second control signal s2, which has a pulse duty factor that is a function of the excitation current, and has means for selecting the control signal having the smaller of the two pulse duty factors. This control signal s having the smaller of the two pulse duty factors is supplied to the output stage of the generator regulator at an engine start, that is, in the standstill phase of the engine, at an active regulator. This achieves that an excitation current is continuously running through the excitation winding, on account of which a phase voltage having an amplitude sufficient for an evaluation of the phase voltage is also provided, this phase voltage being supplied to regulator control 7. In this context it is ensured that, if more favorable working points are present, which are present, for example, at lower temperatures, no more current is taken from the battery than necessary.

One advantage of this procedure is that in the case in which a very large pulse duty factor were set, because of a very high temperature or an error, such as by an interruption in the exciter circuit, one could fall back upon or limit to the specified, fixedly set pulse duty factor.

What is claimed is:

1. A device for minimizing the current consumption of a motor vehicle generator from a battery during a starting phase of the motor vehicle, comprising:
    a generator regulator having a regulator control and an output stage;
    wherein the regulator control supplies an output control signal having a pulse duty factor to the output stage, and wherein the regulator control includes:
    a first unit providing a first control signal having a specified, fixedly set pulse duty factor;
    a second unit providing a second control signal in parallel with the first control signal, the second control signal having a pulse duty factor which is a function of an excitation current; and
    a selection unit (i) selecting one of the first and second control signals having the smaller pulse duty factor based on a comparison of the first and second parallel control signals, and (ii) supplying the selected control signal to the output stage as the output control signal, wherein the selection unit is distinct from the first and second units.

2. The device as recited in claim 1, further comprising:
a measuring unit measuring the excitation current, wherein the measuring unit is connected to the second unit providing the second control signal.

3. The device as recited in claim 2, wherein the first unit providing the first control signal includes a nonvolatile memory in which data are stored, and wherein the fixedly set pulse duty factor is selected from the stored data.

4. The device as recited in claim 2, wherein the second unit providing the second control signal includes a computing unit which generates the second control signal as a function of the excitation current.

5. A device for minimizing the current consumption of a motor vehicle generator from a battery during a starting phase of the motor vehicle, comprising:
a generator regulator having a regulator control and an output stage;
wherein the regulator control supplies an output control signal having a pulse duty factor to the output stage, and wherein the regulator control includes:

a first unit providing a first control signal having a specified, fixedly set pulse duty factor;
a second unit providing a second control signal in parallel with the first control signal, the second control signal having a pulse duty factor which is a function of an excitation current; and
a selection unit distinct from the first and second units;
wherein:
the selection unit includes a comparator for selecting one of the first and second control signals having the smaller pulse duty factor;
the comparator is connected to the first unit providing the first control signal and to the second unit providing the second control signal, wherein the comparator compares the first and second parallel control signals; and
the comparator provides, on an output side, the one of the first and second control signals having the smaller pulse duty factor based on the comparison between the first and second parallel control signals.

* * * * *